Patented Feb. 11, 1936

2,030,469

UNITED STATES PATENT OFFICE 2,030,469

MANUFACTURE OF PARCHMENT PAPERS

George A. Richter, Berlin, N. H., assignor to Brown Company, Berlin, N. H., a corporation of Maine No Drawing. Application September 2, 1932, Serial No. 631,495

2 Claims. (Cl. 8—20)

This invention relates to the manufacture of so-called, vegetable parchment or parchment paper which is prepared by the action of suitable chemical parchmentizing solutions on a paper base. In producing such papers, a chemical parchmentizing solution, usually sulphuric acid solution, has heretofore been brought in contact with a waterleaf paper base under such conditions as to cause incipient solution or gelling of the cellulose. When a paper so-treated is then washed and dried, a more or less translucent sheet, characterized by its qualities of toughness, density, and high strength in both dry and wet condition, is secured. Parchment paper is possessed not only of comparatively low water-absorbency, but also of comparatively high grease-resistance. It is hence not surprising that parchment paper has many spheres of use, wherein high wet strength and/or high grease-resistance is desired. Thus, it is widely used for wrapping lard, meats, butter, vegetables, and other wet and/or greasy substances. It is also used for such purposes as lamp shades and to a limited extent as a writing and/or printing paper.

In some connections, the translucency of parchment paper is a distinct handicap despite the fact that such paper otherwise presents eminently satisfactory qualities. For instance, a more widespread use of parchment paper for commercial correspondence or printing purposes has not ensued because it is generally desired that papers of this class be sufficiently opaque so that typing or printing will not show therethrough to a conspicuous degree.

In accordance with the present invention, rather than using a waterleaf paper base for the preparation of parchment paper, I fabricate parchmentized papers containing opaque fillers which impart to such papers an opacity such as is sought in typewriting, printing, or related work. This means that the parchment papers of the present invention possess not only many properties valued in the usual parchment papers but the additional property of opacity, which enhances their value and salability for writing, printing and similar uses. In realizing the parchment papers of the present invention, I proceed in the conventional way, excepting that I fabricate a paper base containing an opaque filler which is either inert with respect to the parchmentizing solution or reacts therewith to form in situ in the paper other fillers of an opaque, insoluble character. Stated generically I parchmentize the paper base while substantially retaining the filler in opaque, undissolved condition in the paper. In some instances, the parchmentizing solution may even convert the filler originally present in the paper into a filler of improved opacity or covering power.

The principles of the present invention may be availed of when papers are being parchmentized, as they generally are, by the action of concentrated sulphuric acid solution, e. g., solutions in the region of about 70% to 75% strength. There are many inorganic fillers, such as the oxides and carbonates of alkaline earth metals, including those of magnesium, barium, and calcium, which can be converted in situ in the paper by the parchmentizing sulphuric acid solution into insoluble sulphates, which, besides being stable and having high opacity or covering power, do not interfere with the realization of other qualities, such as high wet-strength and grease-resistance, desired in the parchment paper. So, too, I may parchmentize papers containing opaque fillers of an organic or inorganic nature, which do not react with the parchmentizing sulphuric acid solution. Representative fillers of this class are various clays, sulphates of the alkaline earth metals, talc, and powdered asbestos.

There are various ways of introducing the opaque filler into the paper base to be parchmentized, depending upon whether the paper is to have a uniform opacity or an opacity which is varied in such a way as to impart a pleasing or ornamental effect to the paper. In the case of writing or printing papers wherein uniformity of appearance is desired, the filler may be distributed uniformly throughout the body of the paper or on its surface. The filler may, for example, be disseminated uniformly throughout the papermaking stock as it is being prepared for papermaking in the beater engine. Or, if desired, the filler may be non-uniformly incorporated into the paper at a suitable stage of its fabrication so as to provide a pleasingly splotchy or variegated effect such as is sometimes desired in writing or printing papers. For instance, the filler may be deposited on the freshly-formed, wet web of paper, as by the aid of stencils, in a manner to leave localized areas of the paper substantially devoid of filler or of lower filler content than that of other areas. These localized areas may have predetermined patterns or figures, such as trade-marks. When the paper is passed through the parchmentizing solution, the lower opacity of the areas devoid of filler or poorer in filler than the rest of the paper is accentuated and hence makes for the desired prominence of the patterns or figures.

The paper base with which I associate the filler is preferably one made from cotton rags or refined wood pulp, as such a base is sufficiently absorptive to permit the desired penetration of the parchmentizing solution thereinto and therethrough. The paper is, as ordinarily, led through a bath of suitable parchmentizing solution, e. g., a solution of sulphuric acid of about 70% to 75% strength, whence it proceeds through a bath of wash water and finally over a bank of steam-heated drier drums.

When the filler present in the paper base is an oxide, carbonate, or other compound capable of reacting with the parchmentizing sulphuric acid solution to form an insoluble, opaque sulphate, the parchmentizing solution serves the function of forming such sulphates during the parchmentizing reaction. Many of the sulphates, especially those of the alkaline earth metals, are of high opacity or covering power. It is thus seen that the present invention makes possible the parchmentization of papers and the simultaneous conversion in situ therein of fillers into others of better characteristics. It is, for example, possible to fabricate the paper base with inexpensive fillers of an inferior variety, and, at exceedingly low cost, to transform such fillers into improved ones, since the only cost is that of the sulphuric acid consumed in effecting a partial or complete conversion of the original fillers into sulphates.

In some instances, an organic filler, rather than an inorganic one, may be used in the paper. For instance, powdered ground-wood pulp or wood flour may be used as an opaque filler in the paper. So, too, a powdered, hydrated cellulose prepared from well-beaten or well-hydrated cellulose pulp may serve as the opaque filler in the paper. The powdered, hydrated cellulose can be prepared by beating or hydrating cellulose pulp to a pronounced degree, then drying the well-hydrated pulp, and powdering the dried, hydrated fibers, as in a ball mill. These special forms of cellulose are not rendered translucent by the action of the parchmentizing sulphuric acid solution and hence are capable of producing the effects hereinbefore described in the parchmentized paper product.

In terming the papers of the present invention "parchment" or "parchmentized papers," I mean that they are essentially like the usual parchment papers excepting that they have a partial or complete opacity incident to the use of a paper base containing the appropriate filler, as hereinbefore described. The various fillers hereinbefore mentioned should, of course, be used in a finely pulverulent condition, as they are in ordinary papermaking practice. This finely divided condition conduces to quick reaction with the parchmentizing sulphuric acid solution, when the filler is reactive, and ensures a practically complete conversion of the filler into the sulphate during the parchmentizing reaction. Should the reactive filler be a carbonate, e. g., an alkaline earth metal carbonate, the carbon dioxide liberated during the reaction and entrapped in the paper tends to enhance the opacity of the paper.

The present invention is susceptible of various changes and modifications by those skilled in the art, wherefore, the description hereinbefore given is to be construed as illustrating certain phases of my invention and not as limiting the spirit or scope of invention as defined in the appended claims.

I claim:

1. A process for producing a parchment paper presenting a variegated ornamental appearance which comprises first distributing through a paper base over localized areas only thereof a compound which reacts with parchmentizing, sulphuric acid solution to produce an insoluble, opaque filler in situ in the base, and thereafter treating the paper with said solution to effect its parchmentization and to produce said filler.

2. A process for producing a parchment paper presenting a variegated ornamental appearance which comprises first distributing through a paper base over localized areas only thereof an alkaline earth metal carbonate, and thereafter parchmentizing said base with a solution of sulfuric acid to liberate carbon dioxide from said carbonate and simultaneously to convert said carbonate in situ in said paper into an insoluble, alkaline earth metal salt of said acid.

GEORGE A. RICHTER.